United States Patent [19]
Crosby, Jr.

[11] 3,834,655
[45] Sept. 10, 1974

[54] TETHERED BALLOON REFUELING SYSTEM

[75] Inventor: Edward L. Crosby, Jr., Indialantic, Fla.

[73] Assignee: The United States of America as represented by the Secretary of the Air Force, Washington, D.C.

[22] Filed: Mar. 26, 1973

[21] Appl. No.: 344,786

[52] U.S. Cl............................ 244/135 R, 244/33
[51] Int. Cl....................... B64d 39/00, B64b 1/50
[58] Field of Search........ 244/135 R, 135 A, 30, 31, 244/33

[56] References Cited
UNITED STATES PATENTS
1,061,484  5/1913  Lowe................................. 244/30
2,849,200  8/1958  Person............................ 244/135 A
3,412,958  11/1968  Struble........................... 244/135 A Primary Examiner—Duane A. Reger
Assistant Examiner—Charles E. Frankfort
Attorney, Agent, or Firm—Harry A. Herbert, Jr.; Arsen Tashjian

[57] ABSTRACT

A system for refueling a tethered balloon while in flight by resupplying fuel to the auxiliary power unit without reeling in the main balloon. A nose ring attached to the tanker balloon guides it upward along the main balloon tether and serves to hold a probe on the fuel line in position to automatically engage a drogue which acts as an inlet for a pump mounted on a structure attached to the main balloon. Operation of the pump transfers the fuel from the tanker balloon to the fuel tank in the main balloon.

3 Claims, 2 Drawing Figures

TETHERED BALLOON REFUELING SYSTEM

BACKGROUND OF THE INVENTION

This invention relates to a system for refueling a tethered balloon while in flight and, more particularly, the invention is concerned with providing a method and means for resupplying the fuel tank of an auxiliary power unit on a tethered balloon without reeling in or lowering the balloon to the ground.

Since before 1850 balloons of many types have been recognized as useful elevated platforms for reconnaissance and surveillance for purposes of many kinds, not limited to military use. In recent years, beginning in the late 1960's, it has been appreciated that the tethered, kite-balloon of aerodynamic shape would be a very cost-effective aerial observation vehicle if it could be improved as regards its performance in severe weather.

It is obvious that any surveillance platform must be a relatively all-weather facility. Recent research and development activity has been directed, for military purposes, at improving the all weather utility of kite-balloons and at present it appears that these efforts will be more or less successful. In fact, private interests are now planning to use balloons as communications relay "towers." Modern balloons for the subject services are unmanned and carry electric power-plants to supply energy to their payloads. These payloads may have an endless variety of missions using radar, television, active radio links, acoustic imagers, triangulation apparatus and so on. The power required runs into the order of 10 kilowatts and is best supplied, at present, by "auxiliary power units" (APU's) based on internal combustion engines powered, typically, by gasoline.

The primary determinant in auxiliary power unit choice is kilowatts per pound, since balloon weight carried aloft is a first order determinant of the displacement-altitude function. To take the above one step farther, it turns out that fuel load is a major problem at the present state of balloon system development. To keep a 10 kilowatt payload operating for more than a day or so requires such a takeoff weight (hence such a large balloon) that is is less expensive to use two balloons alternating "on station." For this reason, methods of refueling the balloons' auxiliary power units have been studied and two generic means of so doing have been discussed.

One "prior art" method is to resupply fuel through a flexible tube incorporated into or attached to the tether cable. Apart from the mechanical problems of coping with the fuel tube, the scheme is basically impractical for any but the very lowest altitudes because of the addition of weight of the fuel tube, which must be supported by the buoyant lift of the balloon. Suffice it to say that a quantitative study will quickly and conclusively indicate that the tether fuel pipe scheme is inadequate. The second major refuelling scheme is to use a tanker helicopter. This has been performed in British experiments but it is not considered practical for routine use. There are various problems including the danger to both vehicles attendant to rotary-wing aircraft near tethered balloons, danger of perforating the balloon by the "line-throwing" gun, complex rigging of the balloon drogue, weather limitations, and the long practice and extraordinary skill required of the "chopper" crew.

SUMMARY OF THE INVENTION

The present invention is concerned with providing a system for refueling a tethered balloon while in flight by resupplying fuel to the auxiliary power unit in the balloon without reeling it in. This is accomplished by using a small balloon as a tender or tanker.

The main balloon while flying on its tether includes a funnel-shaped drogue which is connected to the gas tank of the auxiliary power unit. The drogue is located firmly at the confluence point of the main balloon which is fixed with respect to the balloon's heading. An electrically driven pump is connected in series in the fuel line between the drogue and the fuel tank of the auxiliary power unit.

The tanker balloon is provided with a probe which is positioned fixedly ahead of a horizontal nose ring on the small balloon. The probe is connected by a fuel line to the tank on the tanker balloon for resupplying the main balloon. In refueling, the small balloon's probe engages the main balloon's drogue and the pump transfers the fuel from the small balloon to the main balloon. The essential juxtaposition of the probe and drogue is automatically provided by their positioning and by the nose ring of the tanker which is enclosed around the tether of the main balloon at the time the small balloon is launched.

Accordingly, it is an object of the present invention to provide a system for refueling a tethered balloon without "reeling in" to permit the balloon to remain on station for extended periods of time.

Another object of the invention is to provide a balloon refueling system whereby a main tethered balloon can be maintained on station at very high altitudes by refueling its power supply with a tanker balloon sent aloft on the tether of the main balloon.

Still another object of the invention is to provide a system for refueling a tethered balloon by supplying the power plant which supplies energy to the payload with fuel from a tanker balloon thereby allowing substantially uninterrupted operation of the power plant.

A further object of the invention is to provide a refueling system for a tethered balloon wherein the fuel is delivered without the use of a helicopter or without running a fuel line from the ground to the tethered balloon.

A still further object of the invention is to provide a tethered balloon refueling system wherein the probe on a tanker balloon riding on the main balloon tether automatically engages the drogue extending downward from the main balloon pump. The lift of the tanker balloon operates to supply the force to maintain the probe in engagement with the drogue on the main balloon.

These and other objects, features and advantages will become more apparent after considering the following description taken in conjunction with the annexed drawings and appended claims.

DESCRIPTION OF A PREFERRED EMBODIMENT

Figure 1:
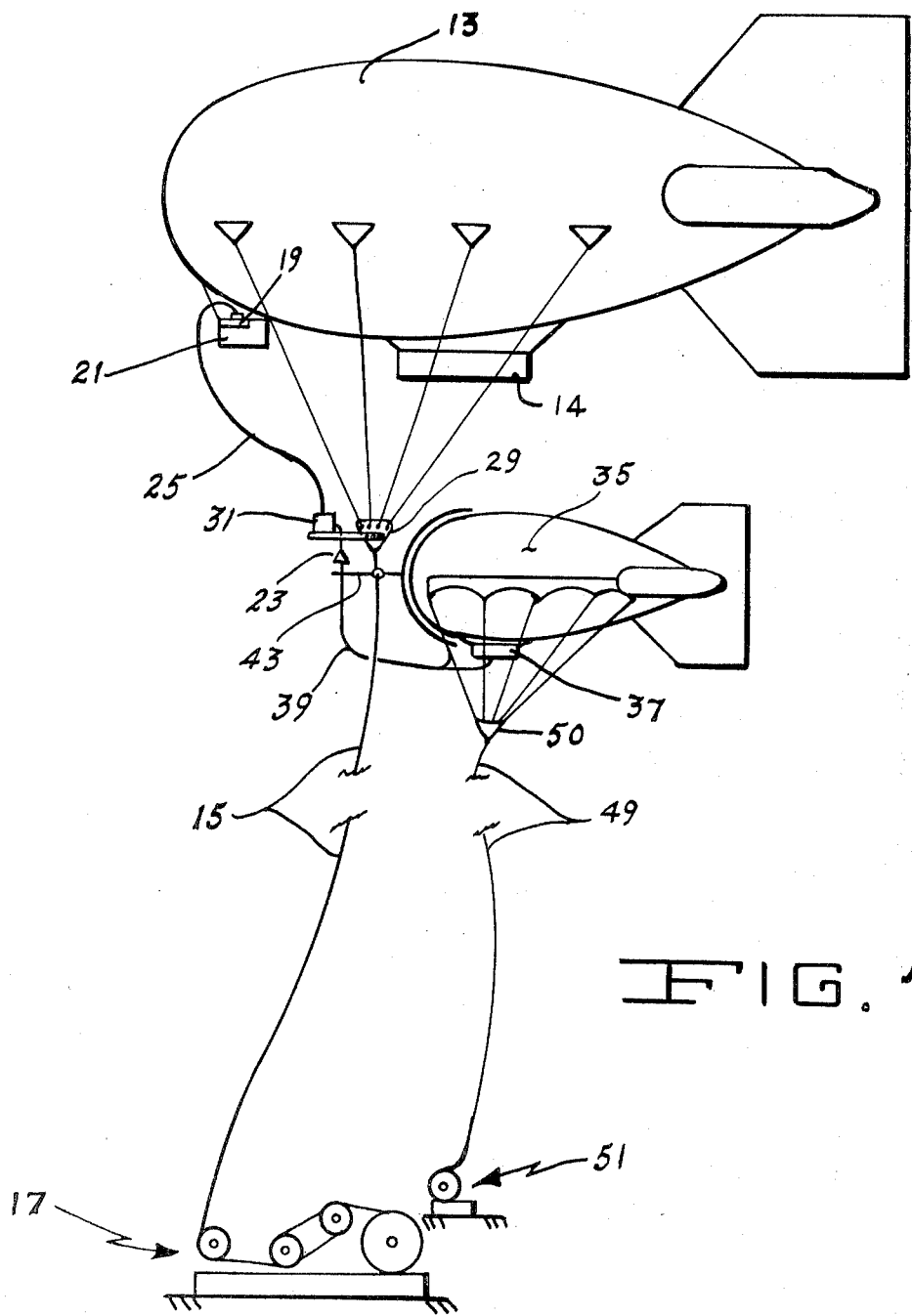
FIG. 1 is a general view of the main balloon being refueled by a tanker balloon in position according to the invention.

Referring now to the drawings, there is shown a main balloon 13 which may be on the order to 100,000 cubic feet in size. The main balloon 13 having a payload 14 suspended therefrom, is shown flying on its tether 15 which ends on the ground at the tether winch 17. A gas tank 19 for supplying the auxiliary power unit 21 is provided with a drogue 23 which is attached to the lower end of the main balloon supply hose 25. The drogue 23 is located firmly near the confluence point which is the point where the main balloon suspension lines 27 converge and connect to the spreader plate 29, to which the upper end of the tether 15 is connected. The point at which the drogue 23 is located is fixed with respect to the balloon's heading and its confluence point. An upward loop is provided in the main balloon fuel line 25 at the fuel tank 19 of the auxiliary power unit 21 to prevent the fuel tank 19 from draining. An electrically driven pump 31 is connected in series in the main balloon fuel line 25 and may be mounted on a bracket support 33 which is fixedly attached to the spreader plate 29.

Beneath the main balloon 13, there is positioned a tanker balloon 35 which may be on the order of 7,500 cubic feet in size with a lift capability of about 175 pounds to 10,000 feet altitude. The tanker balloon 35 carries a fuel tank 37 for resupplying the main balloon 13. The tank 37 is provided with a fuel line 39 having a probe 41 at its outermost terminal end and fixedly positioned ahead of a horizontal nose ring 43, carried on the nose structure 45 of the tanker balloon 35. In refueling, the probe 41 of the tanker balloon 35 engages the funnel-shaped drogue 23 of the main balloon 13 and the refueling operation is accomplished by energizing the electric pump 31 which transfers the fuel from the tanker balloon supply 37 to the main balloon auxiliary power unit tank 19.

Figure 2:
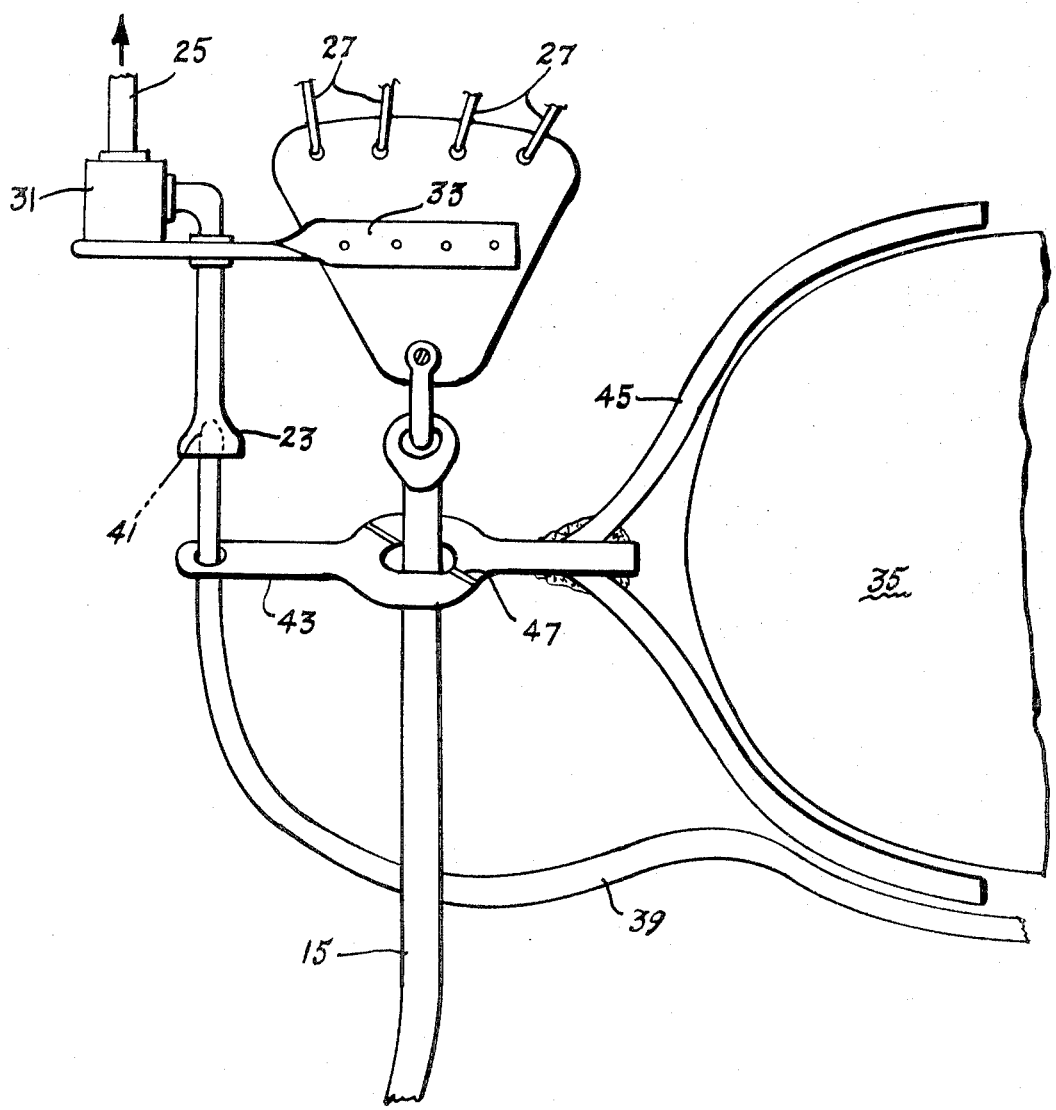
FIG. 2 is a detailed view of the probe on the tanker balloon in engagement with the drogue on the main balloon showing the position of the tanker balloon on the main balloon tether.

The essential juxtaposition of the probe 41 and the drogue 23 is automatically provided by their relative positioning and by the nose ring 43 which is loosely encircled around the tether 15 of the main balloon 13 by means of the latch 47 at the time that the tanker balloon 35 is launched. These mechanical relationships are more clearly shown in the detail view of FIG. 2.

MODE OF OPERATION

In operation, at a time when the fuel tank 19 of the auxiliary power unit 21 on the main balloon 13 is known to be low on fuel, the tanker balloon 35 is removed from its van in already inflated condition. The gas tank 37 attached to the tanker balloon 35 is filled and a tether 49 is connected at the confluence point 50 of the balloon 35. The nose ring 43 is opened, positioned around the main balloon tether 15 and then closed by means of the latch 47. The tanker balloon 35 is allowed to rise by releasing the tether 49 from the winch 51. When it nears the main balloon 13, it will "line up" to the same heading if it was not already so aligned because of an altitude difference in wind direction.

Because of the fixed relative positions of probe 41 and the drogue 23 with respect to the main tether 15, their mutual engagement is automatic. The operation of the electrically driven pump 31 may be initiated by telemetry command from the ground or it may be made automatic by one of several means, as for example, being actuated by the pressure of the probe 41 in the drogue 23. The pumping cycle may be terminated on the basis of a "tank-full" signal from the main balloon auxiliary power unit fuel tank 19 or by a tank level telemeter to the ground. Termination is accomplished by simply shutting down the pump 31.

The tanker balloon 35 is disengaged simply by hauling down on its tether 49 by the winch 51. A rubber-to-rubber jam fit between the probe 41 and the drogue 23 is preferable to an elaborate mechanical hose-coupling arrangement. When the tanker balloon 35 is hauled back down to the ground, the tank 37 should be empty. It should be noted that one of the more significant features of the invention is that the main and tanker balloons are both aligned in azimuth because their position is fixed at a set distance from the tether 15 of the main balloon 13 and both balloons 13 and 35 being kite balloons, head in the same direction. The heights of the probe 41 and drogue 23 are fixed so that they jam together. The force required to hold them together is small and is applied by the lift of the tanker balloon 35. If the wind should change direction, both of the balloons will swing around together and, thus, the refueling operation will not be interrupted.

It should be noted that, the hereinbefore description of the invention is presented as a working exemplification and that other variations and considerations may be taken into account. For example, the pump 31 should be placed so that its suction tends to hold the probe 41 and drogue 23 in engagement. It cannot be so high above the tank 37 of the tanker balloon 35 that it is required to "pull" a vacuum as this condition would obviously not transfer the fuel as required. An anti-syphon trap in the fuel line 25 is required and the remaining fuel in the drogue line will be spilled at the termination of refueling and, therefore, should be as small-bore as is consistent with convenient value of pump pressure and refueling time.

By using the hereinbefore described invention, it should be possible to keep the main balloon 13 on station for months, if desired. The tanker balloon 35 may be simplified by being made lighter because of no prolonged exposure to weather. Also, it may be an expanding gore type because its airworthiness below altitude is no problem and it may even be made without an empennage (tail) since its direction moment will be effective from the nose ring 43, not from its tether point.

Although the invention has been illustrated in the accompanying drawings and described in the foregoing specification in terms of a preferred embodiment thereof, the invention is not limited to this embodiment or to the preferred configuration mentioned. It will be apparent to those skilled in the art that my invention could have extensive use in other operations where it is desirable to maintain a large balloon "on station" for periods of time exceeding 8 hours and where power requirements necessitate the use of an auxiliary power unit, to supply power to a payload on the main balloon.

Having thus set forth the nature of my invention, what I claim and desire to secure by Letters Patent of the United States is:

1. A system for refueling the auxiliary power unit on a main balloon having a tether line attached thereto, said refueling system comprising a tanker balloon of similar configuration to the main balloon and having a supply tank for replenishing the fuel supply of the auxiliary power unit on the main balloon, a nose ring attached to the nose of said tanker balloon, said nose ring encircling the tether line of the main balloon, wind responsive means for positioning and maintaining said tanker balloon on the same heading as the main balloon, a fuel line extending from the supply tank on said tanker balloon to said nose ring, the outer portion of said fuel line being fixedly attached to said nose ring, means on the main balloon for automatically engaging the outer end of the fuel line extending from said tanker balloon, and means for transferring fuel from the supply tank on the tanker balloon to the auxiliary power unit on the main balloon thereby permitting the auxiliary power unit on the main balloon to be refueled while in flight.

2. The tethered balloon refueling system defined in claim 1 wherein said means on the main balloon for automatically engaging the outer end of the fuel line extending from said tanker balloon includes a downwardly oriented funnel-shaped drogue fixedly positioned at the lowermost end of a fuel line extending from the auxiliary power unit on said main balloon, and an upwardly oriented probe on the outermost end of the fuel line from said tanker balloon, said drogue and probe operatively engaging one another to produce a suitable connection when said tanker balloon nears the main balloon altitude.

3. The tethered balloon refueling system defined in claim 2 wherein the means for transferring fuel from the supply tank on the tanker balloon to the auxiliary power unit on the main balloon includes an electrical fuel pump serially connected in the main balloon fuel line between said funnel-shaped drogue and the auxiliary power unit, said electrical pump being mounted on a bracket support fixedly attached to the spreader plate on the main balloon.

* * * * *